(12) United States Patent
Contreras et al.

(10) Patent No.: US 8,305,712 B2
(45) Date of Patent: Nov. 6, 2012

(54) TUNABLE MICROSTRIP SIGNAL TRANSMISSION PATH IN A HARD DISK DRIVE

(75) Inventors: John T. Contreras, Palo Alto, CA (US); Luiz Franca-Neto, Sunnyvale, CA (US); Stephen Williams, Morgan Hill, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 364 days.

(21) Appl. No.: 12/646,612

(22) Filed: Dec. 23, 2009

(65) Prior Publication Data

US 2011/0149443 A1    Jun. 23, 2011

(51) Int. Cl.
*G11B 5/55* (2006.01)
(52) U.S. Cl. ..................... 360/245.9; 360/246
(58) Field of Classification Search ........ 360/245.8–246
See application file for complete search history.

(56) References Cited

U.S. PATENT DOCUMENTS

| | | | |
|---|---|---|---|
| 3,925,740 A | 12/1975 | Steensma | |
| 4,074,270 A | 2/1978 | Kaloi | |
| 5,357,225 A | 10/1994 | Mortensen | |
| 5,729,183 A | 3/1998 | Schuchmann et al. | |
| 6,005,519 A | 12/1999 | Burns | |
| 6,351,351 B1 * | 2/2002 | Takasugi | 360/245.9 |
| 6,677,831 B1 | 1/2004 | Cheng et al. | |
| 6,677,901 B1 | 1/2004 | Nalbandian | |
| 7,986,494 B2 * | 7/2011 | Pro | 360/245.9 |
| 8,004,798 B1 * | 8/2011 | Dunn | 360/245.8 |
| 2005/0001649 A1 | 1/2005 | Timmins et al. | |
| 2008/0123771 A1 | 5/2008 | Cranford et al. | |

FOREIGN PATENT DOCUMENTS

JP    2007142977    6/2007

OTHER PUBLICATIONS

Yang, et al., "An Elliptic Low-pass Filter With Shorted Cross-over and Broadside-coupled Microstrip Lines", *IEEE MTT-S Digest*, (2003),535-538.
Jeong, et al., "Tunable Impedance Transformer Using a Transmission Line With Variable Characteristic Impedance", *IEEE Transactions on Microwave Theory and Techniques*, vol. 53, No. 8, (Aug. 2005),2587-2593.

* cited by examiner

*Primary Examiner* — Allen Heinz

(57) ABSTRACT

A disk pack, comprising at least one hard disk, is rotatably mounted to a housing. The disk pack defines an axis of rotation and a radial direction relative to the axis. At least one actuator mounted to the housing is coupled with a suspension and is movable relative to the disk pack. A slider, comprising a slider body and a head configured to read data from and write data to at least one hard disk, is coupled with the suspension. A first suspension electrical interconnect is configured to electrically couple a first signal conducting pathway with the slider and with a first non-terminated signal pathway. A second suspension electrical interconnect is configured to electrically couple a second signal conducting pathway with the slider and with a second non-terminated signal pathway. The length of the second non-terminated signal pathway is selected to achieve a desired impedance level.

20 Claims, 7 Drawing Sheets

START

↓

FABRICATING A SUSPENSION CONFIGURED TO BE COUPLED WITH AN ACTUATOR OF A HARD DISK DRIVE
510

↓

FABRICATING A FIRST SUSPENSION ELECTRICAL INTERCONNECT CONFIGURED TO ELECTRICALLY COUPLE A FIRST SIGNAL CONDUCTING PATHWAY WITH A SLIDER AND WITH A FIRST NON-TERMINATED SIGNAL PATHWAY
520

↓

FABRICATING A SECOND SUSPENSION ELECTRICAL INTERCONNECT CONFIGURED TO ELECTRICALLY COUPLE A SECOND SIGNAL CONDUCTING PATHWAY WITH A SLIDER AND WITH A SECOND NON-TERMINATED SIGNAL PATHWAY
530

↓

END

FIG. 5

TUNABLE MICROSTRIP SIGNAL TRANSMISSION PATH IN A HARD DISK DRIVE

TECHNICAL FIELD

The present technology relates to the field of signal compensation in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider includes a head assembly that has a magnetic read/write transducer or head for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

For many transmission line systems used to convey signals to the slider, the impedance characteristics in the section between the suspension electrical interconnect and the slider are essentially fixed such that compensation networks are used to maximize the signal transfer. Many current compensation networks may include capacitors or inductors and are sometimes impractical to employ, because they add cost and/or can be difficult to replicate in the layout for a given restricted area. Typically, layout replication is done by increasing the overlapping area for capacitive compensation, or by spiral or serpentine layout for inductive compensation. Both capacitive and inductive compensation components consume a significant amount of real estate in the physical layout.

SUMMARY

A disk pack, comprising at least one hard disk, is rotatably mounted to a housing. The disk pack defines an axis of rotation and a radial direction relative to the axis. At least one actuator mounted to the housing is coupled with a suspension and is movable relative to the disk pack. A slider, comprising a slider body and a head configured to read data from and write data to at least one hard disk, is coupled with the suspension. A first suspension electrical interconnect is configured to electrically couple a first signal conducting pathway with the slider and with a first non-terminated signal pathway. A second suspension electrical interconnect is configured to electrically couple a second signal conducting pathway with the slider and with a second non-terminated signal pathway. The length of the second non-terminated signal pathway is selected to achieve a desired impedance level.

DESCRIPTION OF EMBODIMENTS

Reference will now be made in detail to the alternative embodiments of the present technology. While the technology will be described in conjunction with the alternative embodiments, it will be understood that they are not intended to limit the technology to these embodiments. On the contrary, the technology is intended to cover alternatives, modifications and equivalents, which may be included within the spirit and scope of the technology as defined by the appended claims.

Furthermore, in the following detailed description of the present technology, numerous specific details are set forth in order to provide a thorough understanding of the present technology. However, it will be recognized by one of ordinary skill in the art that the present technology may be practiced without these specific details. In other instances, well known methods, procedures, components, and circuits have not been described in detail as not to unnecessarily obscure aspects of the present technology.

Figure 1:
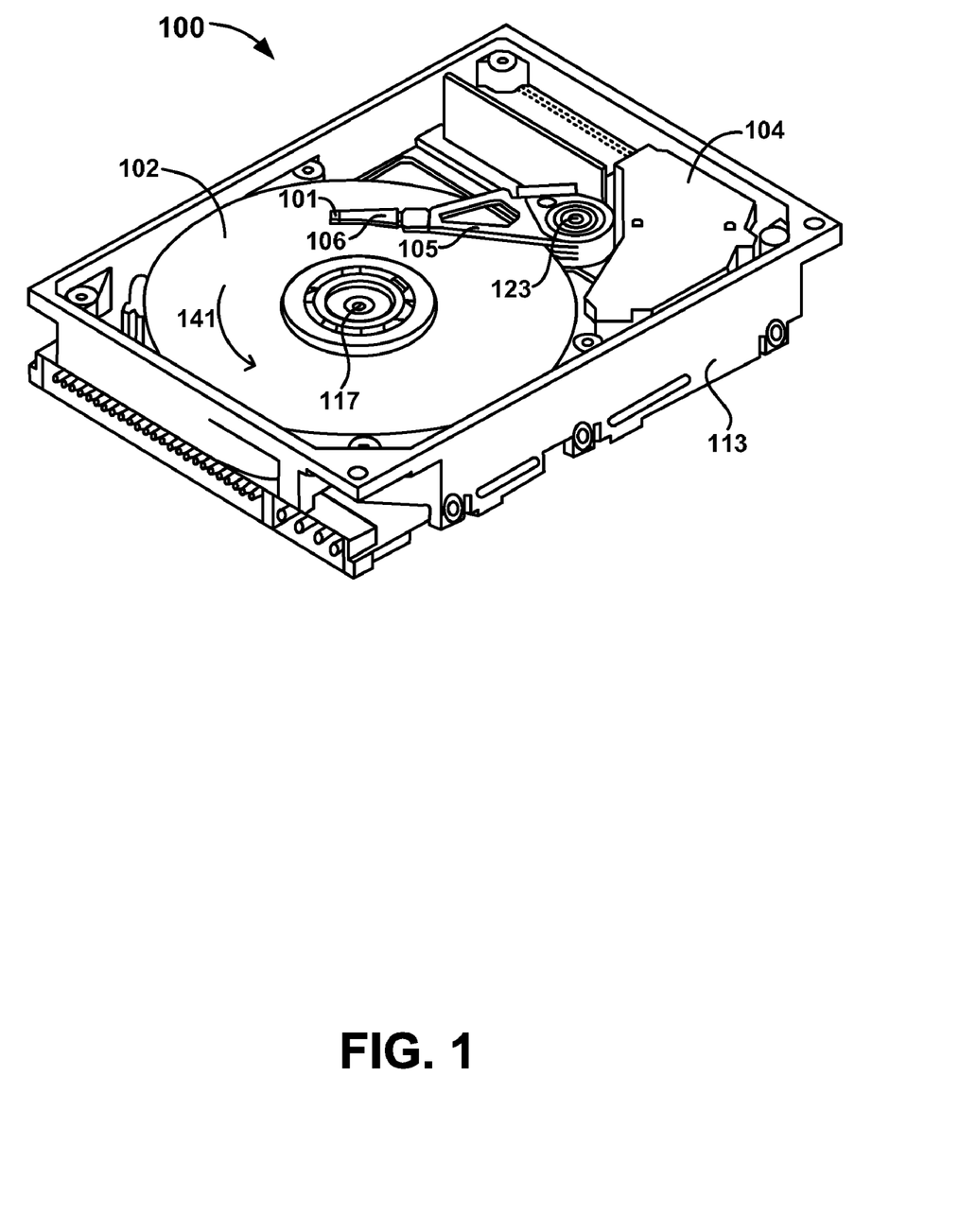
FIG. 1 shows a hard disk drive in accordance with various embodiments.

With reference now to FIG. 1, a schematic drawing of one embodiment of a magnetic hard disk file or drive 100 for a computer system is shown. Drive 100 has a lower housing or base 113 containing a disk pack having at least one media or magnetic disk 102. It is noted that an upper housing (not shown) is typically coupled with housing 113 during normal operation of hard disk drive 100. The disk or disks 102 are rotated (see arrows 141) by a spindle motor assembly having a central drive hub 117. An actuator comprising a plurality of parallel actuator arms 105 (one shown) in the form of a comb that is movably or pivotally mounted to base 113 about a pivot assembly 123. A controller (not shown) is also mounted to base 113 for selectively moving the comb of arms 105 relative to disk 102.

In the embodiment shown, each arm 105 has extending from it at least one cantilevered load beam and suspension 106. A magnetic read/write transducer or head is mounted on a slider 101 and secured to a flexure that is flexibly mounted to each suspension 106. The read/write heads magnetically read data from and/or magnetically write data to disk 102. The level of integration called the head gimbal assembly (HGA) is head and the slider 101, which are mounted on suspension 106. The slider 101 is usually bonded to the end of suspension 106. The head is typically pico size (approximately 1245× 1000×300 microns) and formed from ceramic or intermetallic materials. The head also may be of "femto" size (approximately 850×700×230 microns).

Suspensions 106 have a spring-like quality, which biases or urges the air-bearing surface of the slider 101 against the disk 102 to cause the slider 101 to fly at a precise distance from the disk. A voice coil magnet assembly 104 is mounted to a lower housing 113 and is also mounted to arms 105 opposite the head gimbal assemblies. Movement of the voice coil magnet assembly 104 by the controller moves the head gimbal assemblies along radial arcs across tracks on the disk 102 until the read/write transducer is positioned above the desired data track. The head gimbal assemblies operate in a conventional manner and typically move in unison with one another, unless drive 100 uses multiple independent actuators (not shown) wherein the arms can move independently of one another.

Figure 2A:
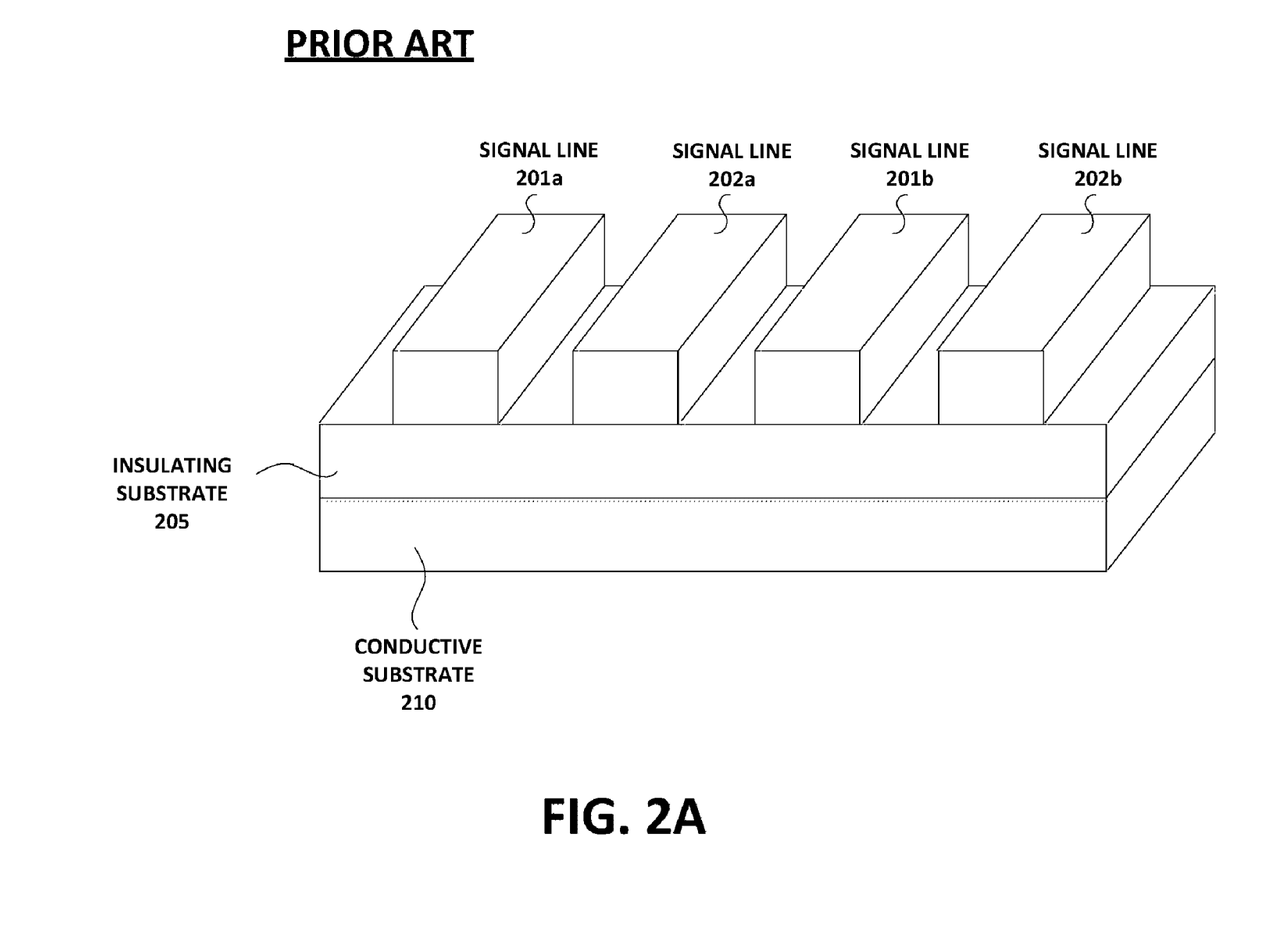
FIG. 2A shows a conventional interleaved signal pathway.

FIG. 2A shows a conventional signal pathway used in hard disk drives. In FIG. 2A, a plurality of signal lines 201a, 201b, 202a, and 202b are disposed upon an insulating substrate 205. In one embodiment, signal lines 201a and 201b are for conveying a positive voltage signal between a controller of hard disk drive 100 (not shown) to slider 101 via suspension 106. Signal lines 202a and 202b are for conveying a negative voltage signal between the controller and slider 101 via suspension 106. In the example of FIG. 2A, signal lines 201a, 201b, 202a, and 202b are interleaved meaning that a single positive voltage signal is carried by both of signal lines 201a and 201b while a single negative voltage signal is carried by both of signal lines 202a and 202b. It is noted that the positive voltage signal and/or the negative voltage signal can be carried by a single complementary signal pair (e.g., a single positive line and a single negative line) in various embodiments. Alternatively, while FIG. 2A shows two complementary signal pairs, various embodiments are well suited to use a greater number of signal pairs as well.

In one embodiment, an optional conductive substrate 210 is disposed beneath insulating substrate 205. Generally, the level of integration comprising signal lines 201a, 201b, 202a, 202b, insulating substrate 205, and optional conductive substrate 210 is known as the interconnect system. It is noted that the desired mechanical and impedance characteristics of the interconnect system can be determining factors in the actual layout of the interconnect system used. For example, the interleaving of the complimentary signal pairs allows for a wider adjustment of the interconnect impedance when the thickness of insulating layer 205 is fixed. In one embodiment, the multiple interleaved signal paths can be replicated N times to achieve a desired impedance level for the interconnect system. Typically, the conductive substrate 210 can create reductions in the impedance level exhibited by the interconnect system. Thus, there is a trade-of between the total width of the cross-section, desired impedance level of the interconnect system, and the amount of substrate backing upon which the complimentary signal pair(s) are disposed.

Figure 2B:
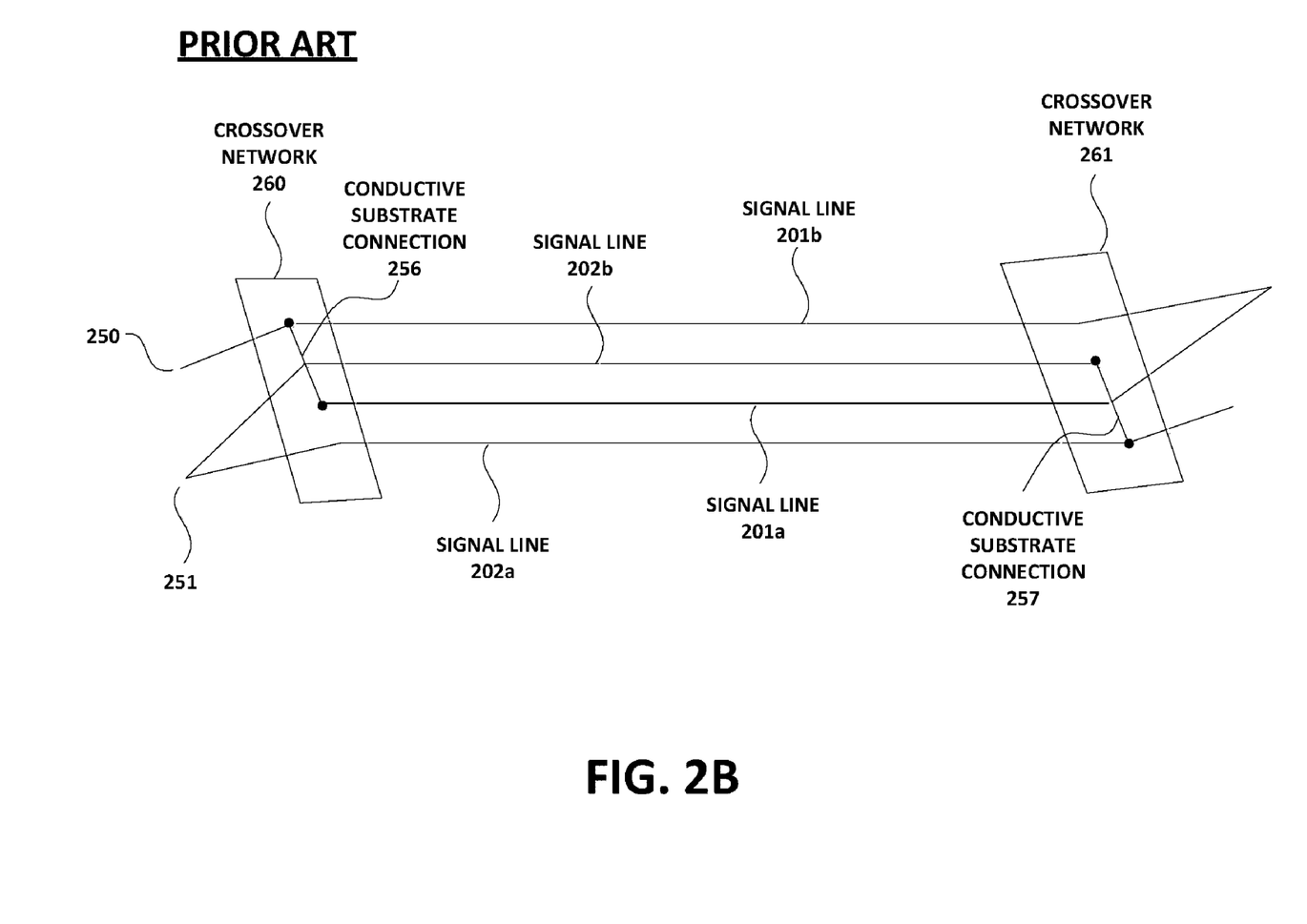
FIG. 2B is a schematic diagram of a conventional signal pathway.

FIG. 2B is a schematic diagram of a conventional signal pathway used in hard disk drives. In FIG. 2B, signals directed to slider 101 are depicted at points 250 and 251. In FIG. 2B, the negative voltage signals are divided at crossover network 260 and travel down the interconnect system as two interleaved lines (e.g., via signal lines 202a and 202b of FIG. 2A). In one embodiment, signal lines 202a and 202b are integrated at or above the level of insulating layer 205. In FIG. 2B, the positive voltage signals are divided at crossover network 260 where a conductive substrate connection 256 couples the positive voltage signal line (e.g., 201a of FIG. 2A) with a second positive voltage signal line (e.g., 201b of FIG. 2A) in the region of a crossover network 260. A second crossover network 261 collects the signals from signal lines 201a, 201b, 202a, and 202b. As shown in FIG. 2B, signal lines 201a and 201b are integrated at or above the level of insulating layer 205 while signal lines 202a and 202b are integrated via the conductive substrate connection 257. However, various embodiments are not limited to this specific configuration. It is noted that signal lines 201a, 201b, 202a, and 202b are interleaved as discussed above with reference to FIG. 2A in the region between crossover networks 260 and 261.

Figure 3:
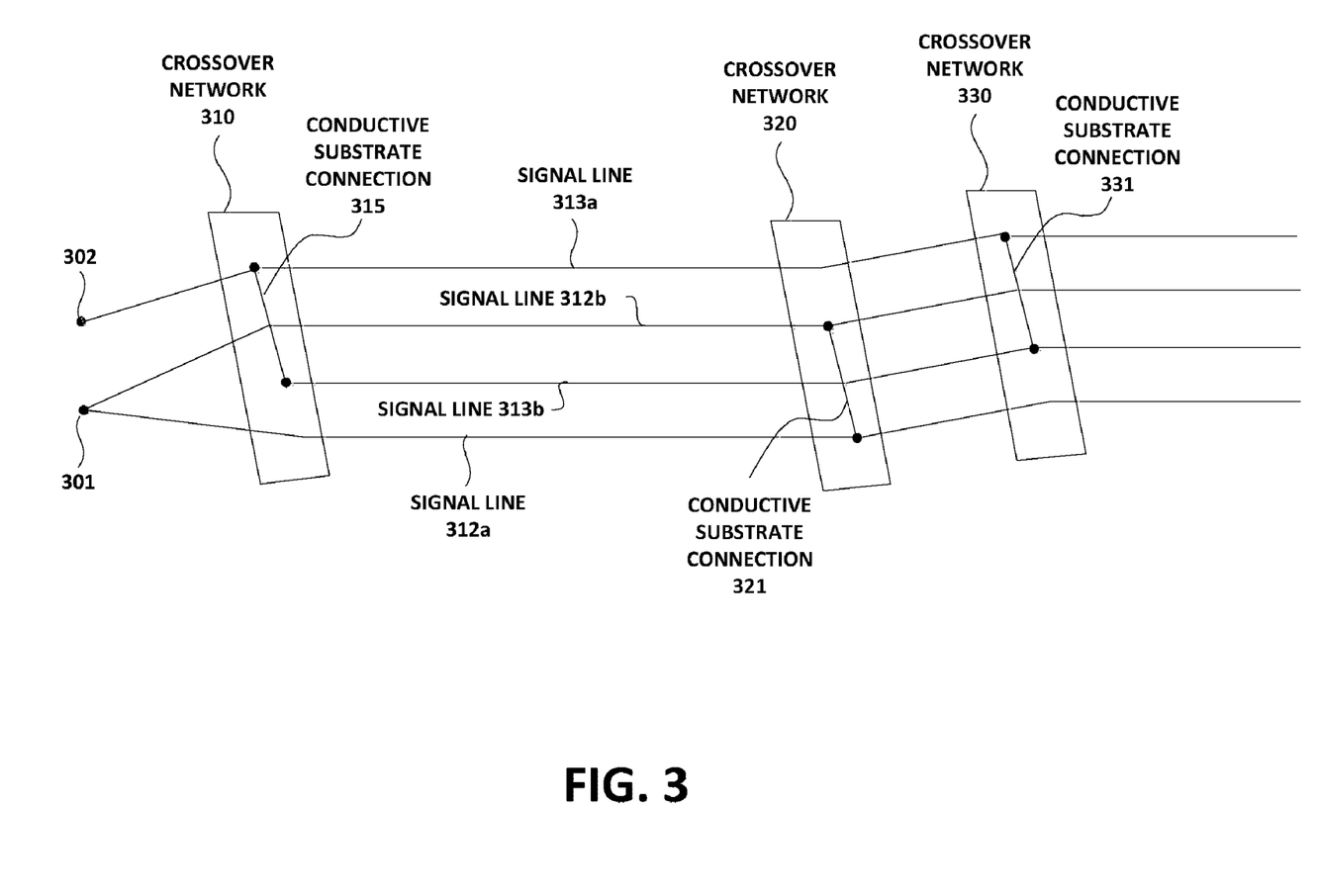
FIG. 3 is a schematic diagram of a tunable microstrip transmission path in accordance with various embodiments.

FIG. 3 is a schematic diagram of tunable microstrip transmission path in accordance with various embodiments. In FIG. 3, positive and negative signals directed to slider 101 are depicted entering the interconnect system at points 301 and 302 respectively. In FIG. 3, the positive voltage signals are divided at crossover network 310 and travel down the interconnect system as two interleaved lines in a manner similar to that described above with reference to FIG. 2A. In one embodiment, signal lines 312a and 312b are integrated at or above the level of an insulating layer (not shown). In FIG. 3, the negative voltage signals are divided at crossover network 310 where a conductive substrate connection 315 couples the negative voltage signal line 313a with a second negative voltage signal line (e.g., 313b) in the region of a crossover network 310. A second crossover network 320 couples the signals from signal lines 312a and 312b. As shown in FIG. 3, signal lines 313a and 313b are integrated via the conductive substrate connection 321. A third crossover network 330 couples the signals from signal lines 313a and 313b. As shown in FIG. 3, signal lines 313a and 313b are integrated via the conductive substrate connection 331.

In one embodiment, signal line 312a and signal line 313a continue to a bonding pad (not shown) for communicatively coupling slider 101 with suspension 106. In other words, signal lines 312a and 313a are terminated at the bonding pad. In one embodiment, signal lines 312b and 313b are not terminated. In other words, the ends of signal lines 312a and 313a away from crossover networks 320 and 330 are not physically coupled with any other component of hard disk drive 100, or with each other. In one embodiment, signal lines 312b and 313b simply end on top of an insulating layer.

Figure 4A:
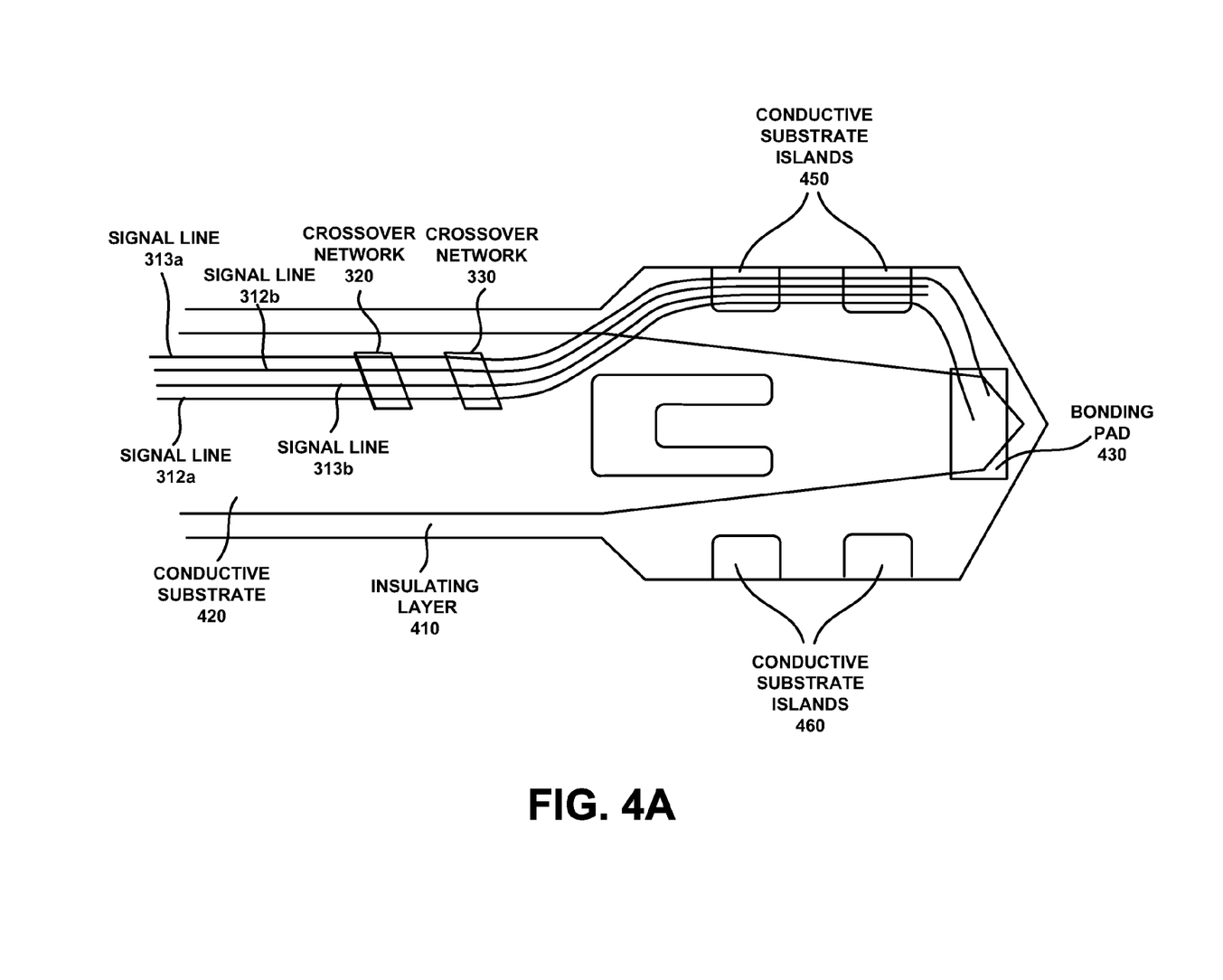
FIG. 4A shows a suspension of a hard disk drive in accordance with various embodiments.

FIG. 4A shows a suspension of a hard disk drive in accordance with various embodiments. In FIG. 4A, an insulating layer 410 is disposed above a conductive substrate 420 of a suspension (e.g., suspension 106 of FIG. 1). As shown in FIG. 4A, due to the configurations of the conductive substrate 420 and insulating layer 410, the interleaved signal lines 312a, 312b, 313a, and 313b cannot be continued all the way to the bonding pad 430 to which a slider (e.g., 106 of FIG. 1) is coupled. As a result, the crossover networks 320 and 330 are disposed at a distance from the bonding pad 430. In various embodiments, signal lines 312a and 313a convey signals to the bonding pad 430, while signal lines 312b and 313b run proximate to signal lines 312a and 313a, but are not terminated as discussed above with reference to FIG. 3. In various embodiments, signal lines 312b and 313b comprise tunable microstrip transmission paths which lower the signal impedance in the gimbal area and thus improve signal transfer for hard disk drive 100. In conventional suspension, the lack of the tunable microstrip transmission paths results in higher impedances in the region of the signal lines between the crossover network and the bonding pad. It would be desirable to continue the crossover network further out along the suspension so that it is closer to the bonding pad. However, the lack of real estate prevents this in conventional configurations. By adding the tunable microstrip transmission paths (e.g., signal lines 312b and 313b) the impedance past the crossover networks is lowered. More specifically, the use of tunable microstrip transmission paths in the gimbal area reduces the impedance of the signal conductive lines within the gimbal area.

In the embodiment of FIG. 4A, signal lines 312b and 313b are disposed between signal lines 312a and 313a. In various embodiments, the length of signal lines 312b and 313b are selected to achieve a desired a desired impedance level for the signal conducting pathway comprising signal lines 312a and 313a. It is noted that the lengths of signal lines 312b and 313b can be independently tuned in length to achieve a desired impedance level and/or electrical compensation. Also shown in FIG. 4A are optional conductive substrate islands 450 which are disposed beneath and proximate to signal lines 312b and 313b. In various embodiments, conductive substrate islands 450 can be used to further lower the effective impedance of signal lines 312a and 313a. In FIG. 4A, additional substrate islands 460 are disposed opposite conductive substrate islands 450 to mechanically balance suspension 106. In various embodiments, substrate islands 450 and 460 comprise substrate material which is disposed beneath insulating layer 410 in the region where signal lines 312a, 312b, 313a, and 313b are not overlying conductive substrate 420. It is further noted that the thickness of the conductive substrate 420 can be selected to achieve a desired level of impedance for signal lines 312a and 313a.

Figure 4B:
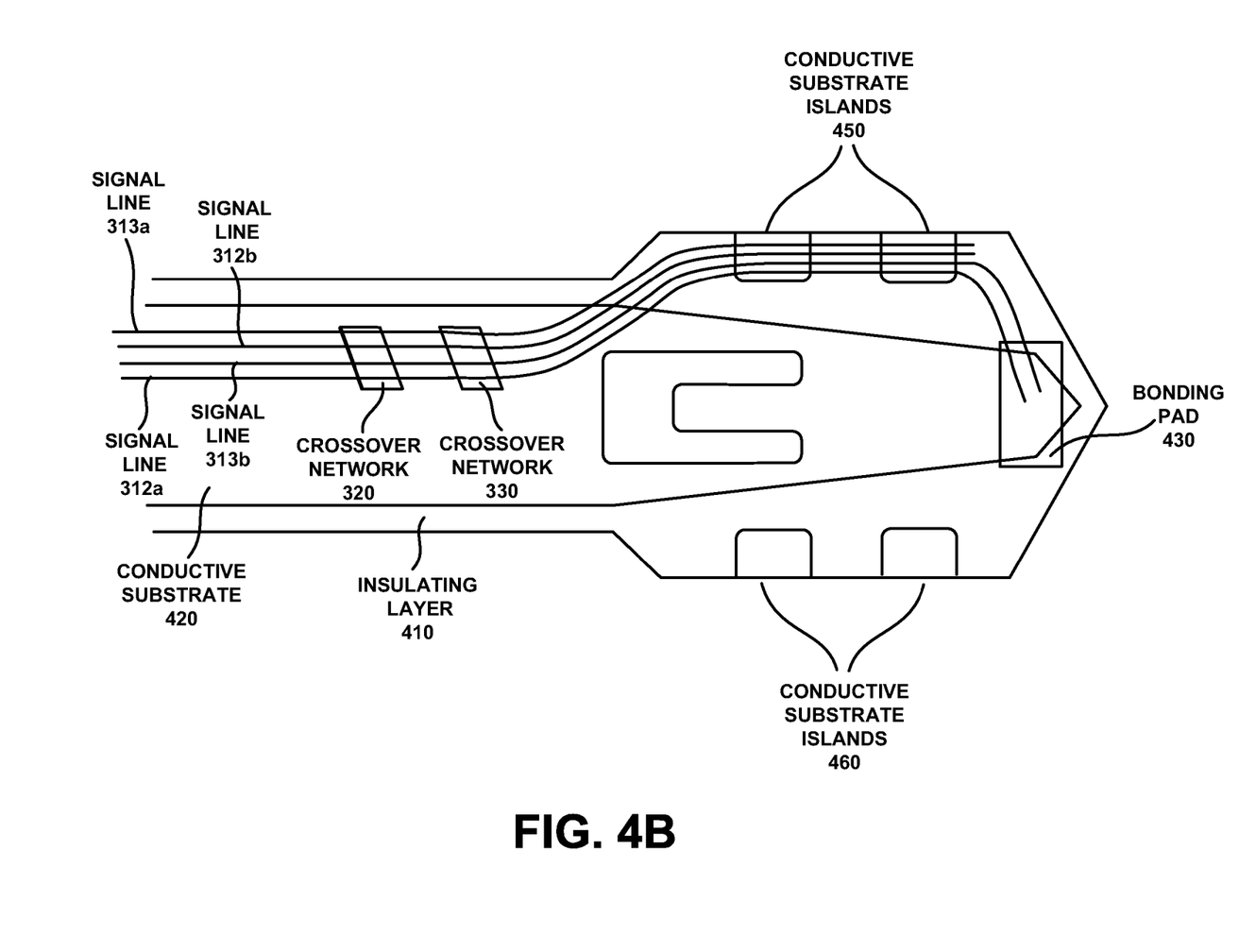
FIG. 4B shows a suspension of a hard disk drive in accordance with various embodiments.

FIG. 4B shows a suspension of a hard disk drive in accordance with various embodiments. In the embodiment of FIG. 4B, the non-terminated signal lines comprising the tunable microstrip transmission path are disposed outside of the signal lines, 312b and 313a, which can be tuned in length independently to achieve a desired impedance level and/or electrical compensation. Terminated signal lines, 312a and 313b, convey the signals to the bonding pad 430. Referring again to the schematic view of FIG. 3, signal lines 312a and 313b would convey signals to bonding pad 430 while signal lines 313a and 312b would comprise the non-terminated signal lines comprising the tunable microstrip transmission path. Again, optional conductive substrate islands 450 can be used to further lower the effective impedance of signal lines 312a and 313b.

Figure 5:
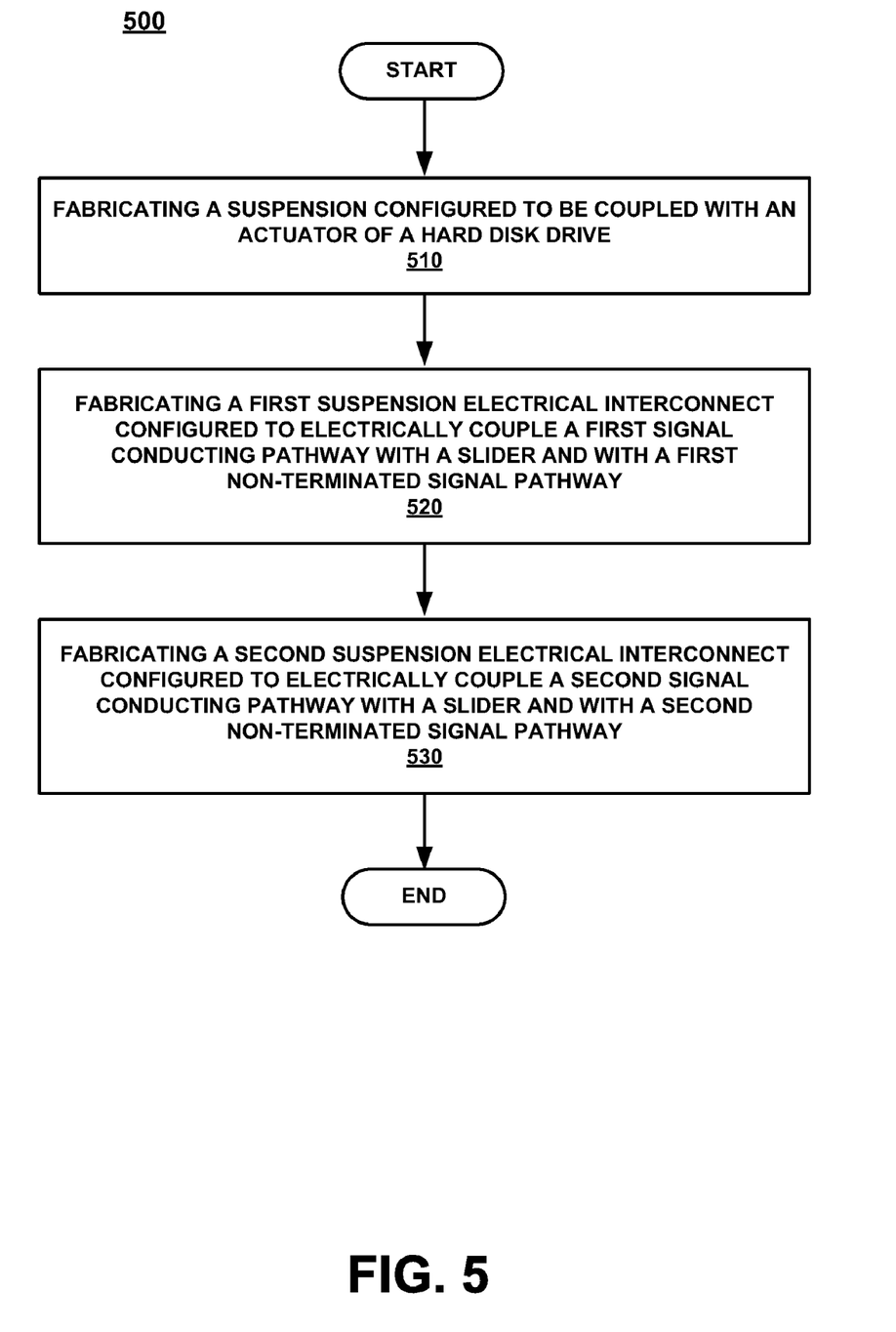
FIG. 5 is a flowchart of a method for fabricating a tunable microstrip transmission path in a hard disk in accordance with various embodiments.

FIG. 5 is a flowchart of a method 500 for fabricating a tunable microstrip transmission path in a hard disk in accordance with various embodiments. In operation 510 of FIG. 5, a suspension configured to be coupled with an actuator of a hard disk drive is fabricated. Referring again to FIG. 1, suspension 106 is coupled with actuator arm 105. In various embodiments, suspension 106 utilizes an interleaved signal lines to convey signals to slider 101 which is disposed at one end of suspension 106. As a result, suspension 106 utilizes an electrical interconnect (e.g., 310 of FIG. 3) to distribute the electrical signals which are then conveyed down suspension 106 via the interleaved signal lines (e.g., 312a, 312b, 313a, and 313b of FIG. 3).

In operation 520 of FIG. 5, a first suspension electrical interconnect which is configured to electrically couple a first signal conducting pathway with a slider and with a first non-terminated signal pathway is fabricated upon the suspension. As discussed above with reference to FIGS. 4A and 4B, various embodiments utilize a first electrical interconnect (e.g., 320 of FIGS. 3, 4A, and 4B) to electrically couple signal lines 312a and 312b. In one embodiment, signal line 312a is coupled with bonding pad 430 to provide signals to slider 101 and signal line 312b continues as a non-terminated tunable microstrip transmission path. In another embodiment, signal line 312a continues as a non-terminated tunable microstrip transmission path and signal line 312b is coupled with bonding pad 430 for conveying signals to slider 101.

In operation 530 of FIG. 5, a second suspension electrical interconnect which is configured to electrically couple a second signal conducting pathway with the slider and with a second non-terminated signal pathway is fabricated upon the suspension. As discussed above with reference to FIGS. 4A and 4B, various embodiments utilize a second electrical interconnect (e.g., 330 of FIGS. 3, 4A, and 4B) to electrically couple signal lines 313a and 313b. In one embodiment, signal line 313a is coupled with bonding pad 430 to provide signals to slider 101 and signal line 313b continues as a non-terminated tunable microstrip transmission path. In another embodiment, signal line 313a continues as a non-terminated tunable microstrip transmission path and signal line 313b is coupled with bonding pad 430 for conveying signals to slider 101.

Embodiments of the present technology are thus described. While the present technology has been described in particular embodiments, it should be appreciated that the present technology should not be construed as limited by such embodiments, but rather construed according to the below claims.

What is claimed is:

1. A system for a tunable microstrip transmission path in a hard disk drive, said system comprising:
    a housing;
    a disk pack mounted to said housing and comprising at least one hard disk that is rotatable relative to said housing, the disk pack defining an axis of rotation and a radial direction relative to the axis;
    at least one actuator coupled with a suspension and mounted to said housing and being movable relative to said disk pack;
    a slider coupled with said suspension, said slider comprising a slider body and a head configured to read data from and write data to said at least one hard disk;
    a first suspension electrical interconnect configured to electrically couple a first signal conducting pathway with said slider and with a first non-terminated signal pathway; and
    a second suspension electrical interconnect configured to electrically couple a second signal conducting pathway with said slider and with a second non-terminated signal pathway and wherein the length of said second non-terminated signal pathway is selected to achieve a desired impedance level for said second signal conducting pathway.

2. The system as recited in claim 1 wherein said first non-terminated signal pathway and said second non-terminated signal pathway are disposed adjacent to said first signal conducting pathway and said second signal conducting pathway.

3. The system as recited in claim 2 wherein said first non-terminated signal pathway and said second non-terminated signal pathway are disposed between said first signal conducting pathway and said second signal conducting pathway.

4. The system as recited in claim 2 wherein said first non-terminated signal pathway and said second non-terminated signal pathway are disposed outside of said first signal conducting pathway and said second signal conducting pathway.

5. The system as recited in claim 1 wherein the length of said first non-terminated signal pathway and said second non-terminated signal pathway is selected to achieve a desired impedance level for said first signal conducting pathway and said second signal conducting pathway.

6. The system as recited in claim 1 further comprising a first conductive substrate disposed beneath an insulating layer comprising said suspension.

7. The system as recited in claim 6 further comprising at least one second conductive substrate disposed beneath said insulating layer at a location separate from said first conductive substrate and below said first non-terminated signal pathway and said second non-terminated signal pathway.

8. A method for fabricating a tunable microstrip transmission path in a hard disk drive, said method comprising:
fabricating a suspension configured to be coupled with an actuator of a hard disk drive and with a slider;
fabricating a first suspension electrical interconnect upon said suspension which is configured to electrically couple a first signal conducting pathway with said slider and with a first non-terminated signal pathway; and
fabricating a second suspension electrical interconnect upon said suspension which is configured to electrically couple a second signal conducting pathway with said slider and with a second non-terminated signal pathway and wherein the length of said second non-terminated signal pathway is selected to achieve a desired impedance level for said second signal conducting pathway.

9. The method as recited in claim 8 further comprising:
disposing said first non-terminated signal pathway and said second non-terminated signal pathway adjacent to said first signal conducting pathway and said second signal conducting pathway.

10. The method as recited in claim 9 further comprising:
disposing said first non-terminated signal pathway and said second non-terminated signal pathway between said first signal conducting pathway and said second signal conducting pathway.

11. The method as recited in claim 9 further comprising:
disposing said first non-terminated signal pathway and said second non-terminated signal pathway outside of said first signal conducting pathway and said second signal conducting pathway.

12. The method as recited in claim 8 further comprising:
selecting the length of said first non-terminated signal pathway to achieve a desired impedance level for said first signal conducting pathway.

13. The method as recited in claim 8 further comprising:
disposing a first conductive substrate beneath an insulating layer comprising said suspension.

14. The method as recited in claim 13 further comprising:
disposing at least one second conductive substrate beneath said insulating layer at a location separate from said first conductive substrate and below said first non-terminated signal pathway and said second non-terminated signal pathway.

15. A suspension for a hard disk drive comprising:
a first suspension electrical interconnect configured to electrically couple a first signal conducting pathway with said slider and with a first non-terminated signal pathway; and
a second suspension electrical interconnect configured to electrically couple a second signal conducting pathway with said slider and with a second non-terminated signal pathway and wherein the length of said second non-terminated signal pathway is selected to achieve a desired impedance level for said second signal conducting pathway.

16. The suspension as recited in claim 15 wherein said first non-terminated signal pathway and said second non-terminated signal pathway are disposed between said first signal conducting pathway and said second signal conducting pathway.

17. The suspension as recited in claim 15 wherein said first non-terminated signal pathway and said second non-terminated signal pathway are disposed outside of said first signal conducting pathway and said second signal conducting pathway.

18. The suspension as recited in claim 15 wherein the length of said first non-terminated signal pathway is selected to achieve a desired impedance level for said first signal conducting pathway.

19. The suspension as recited in claim 15 further comprising a first conductive substrate disposed beneath an insulating layer comprising said suspension.

20. The suspension as recited in claim 19 further comprising at least one second conductive substrate disposed beneath said insulating layer at a location separate from said first conductive substrate and below said first non-terminated signal pathway and said second non-terminated signal pathway.

* * * * *